(12) United States Patent
Khan et al.

(10) Patent No.: US 11,074,563 B2
(45) Date of Patent: Jul. 27, 2021

(54) PRICE VERIFICATION AT A POINT OF SALE SYSTEM

(71) Applicant: Toshiba Global Commerce Solutions Holdings Corporation, Tokyo (JP)

(72) Inventors: Jamal Khan, Morrisville, NC (US); Adrian Rodriguez, Durham, NC (US); Nandan K. Kandregula, Morrisville, NC (US); Jonathan Waite, Cary, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 72 days.

(21) Appl. No.: 16/370,383

(22) Filed: Mar. 29, 2019

(65) Prior Publication Data
US 2020/0311704 A1    Oct. 1, 2020

(51) Int. Cl.
*G06Q 20/20* (2012.01)
*G06K 9/00* (2006.01)
*G07G 1/00* (2006.01)
*G07G 1/01* (2006.01)
*G06F 16/51* (2019.01)

(52) U.S. Cl.
CPC .......... *G06Q 20/201* (2013.01); *G06F 16/51* (2019.01); *G06K 9/00664* (2013.01); *G07G 1/0009* (2013.01); *G07G 1/01* (2013.01)

(58) Field of Classification Search
CPC ...... G06Q 20/201; G07G 1/0009; G07G 1/01; G06F 16/51; G06K 9/00664
See application file for complete search history.

(56) References Cited

U.S. PATENT DOCUMENTS

| | | | | |
|---|---|---|---|---|
| 2009/0094140 | A1* | 4/2009 | Kwan | G06Q 10/087 705/28 |
| 2014/0067631 | A1* | 3/2014 | Dhuse | G06Q 40/12 705/30 |
| 2014/0222601 | A1* | 8/2014 | Soldate | G06Q 10/087 705/22 |
| 2015/0095189 | A1* | 4/2015 | Dharssi | G07G 1/0081 705/26.8 |
| 2015/0186862 | A1* | 7/2015 | Itani | G06Q 20/20 705/23 |
| 2016/0364711 | A1* | 12/2016 | Anderson | G06F 3/147 |
| 2018/0257228 | A1* | 9/2018 | Tingler | B25J 9/1661 |

FOREIGN PATENT DOCUMENTS

JP    08123874    * 5/1996

OTHER PUBLICATIONS

Paolanti M., Sturari M., Mancini A., Zingaretti P., Frontoni E. Mobile robot for retail surveying and inventory using visual and textual analysis of monocular pictures based on deep learning European Conference on Mobile Robots, ECMR, IEEE (2017), pp. 1-6 (Year: 2017).*
Translation of JP08123874 (Year: 1996).*

* cited by examiner

*Primary Examiner* — Nathan A Mitchell
(74) *Attorney, Agent, or Firm* — Patterson + Sheridan, LLP

(57) ABSTRACT

A price verification system for efficient verification of a transaction price when the price is disputed or missing is described. The price verification system uses current images of the item location within a retail environment to determine a shelf price for the item. The shelf price is compared to the price registered a point of sale terminal and displayed to the customer in order to determine if a price adjustment is needed.

20 Claims, 9 Drawing Sheets

PRICE VERIFICATION AT A POINT OF SALE SYSTEM

BACKGROUND

The present disclosure relates to a price verification system in a retail environment, and more specifically, to providing techniques for efficient verification and verification of an item's price during a checkout transaction at a point of sale terminal and/or retail device in response to a price exception event.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for price verification. The method includes receiving a price exception input for an item at a point of sale (POS) retail endpoint, determining from an item database an item location within a retail environment, obtaining a current image of the item location within the retail environment, determining from the current image of the item location a shelf price for the item, and outputting the current image of the item and a visual presentation of determined shelf price for display. Other embodiments of this aspect include corresponding computer systems, apparatus, and computer programs recorded on one or more computer storage devices, each configured to perform the actions of the methods.

In another embodiment, a system to provide price verification is described. The system includes one or more computer processors, a memory containing program code which, when executed by the one or more computer processors, performs an operation. The operation includes receiving a price exception input for an item at a point of sale (POS) retail endpoint, determining from an item database an item location within a retail environment, obtaining a current image of the item location within the retail environment, determining from the current image of the item location a shelf price for the item, and outputting the current image of the item and a visual presentation of determined shelf price for display.

In another embodiment a computer program product to provide price verification is described. The computer program product includes a computer-readable storage medium having computer-readable program code embodied therewith, the computer-readable program code executable by one or more computer processors to perform an operation. The operation includes: receiving a price exception input for an item at a point of sale (POS) retail endpoint, determining from an item database an item location within a retail environment, obtaining a current image of the item location within the retail environment, determining from the current image of the item location a shelf price for the item, and outputting the current image of the item and a visual presentation of determined shelf price for display.

DETAILED DESCRIPTION

Figure 1:
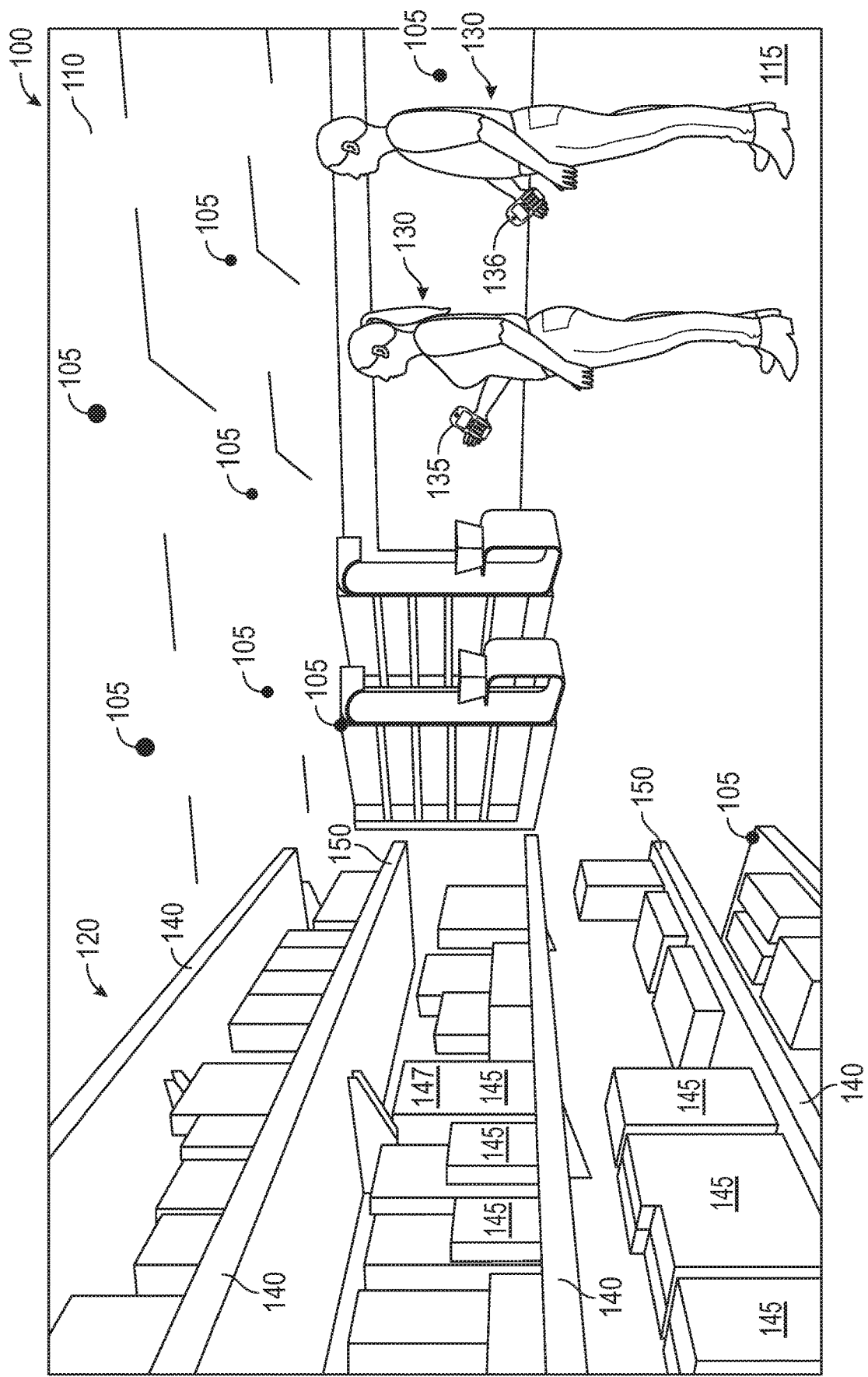
FIG. 1 illustrates an exemplary retail environment including a plurality of items, according to one embodiment.

Aspects of the current disclosure relate to providing price verification in a retail environment. In many retail environments, the price of items including discounts, sales, and other promotions are displayed along with the item in the retail environment. The display price or shelf price of the item serves both to draw customer interest in the item and to inform the customer of the price of the item. In most cases, when the item is scanned and/or looked-up at a point of sale (POS) or point of service system, such as a checkout register, an employee mobile device and/or a personal mobile device, the display/shelf price is accurately added to the transaction and displayed to the customer. However, in some cases, the customer may disagree with the transaction price at the POS terminal or the price of the item is not available. Whenever, there is a discrepancy between the price the customer is expecting and the transaction price or the price is not available at the POS terminal, many retailers have policies that involve one or more employees physically navigating the retail environment to determine the displayed and/or shelf price, relaying that information back to a POS user, providing the information found by the employee to the customer, and then adjusting or maintaining the transaction price at the POS terminal.

These methods for handling the price discrepancy and verifying the price involve large amounts of wasted employee time and can cause delays at the POS terminal for both the customer disputing the price and others waiting to checkout at the POS terminal. Additionally, in some cases, a customer is not involved in the price verification, (e.g., the customer remains at a checkout point) and is only informed if the POS/transaction price will be altered according to the discrepancy once the employees have verified the price. This lack of involvement can cause customer dissatisfaction with the process and can only further lengthen delays if the customer continues to dispute the price.

The systems and methods described herein provide an efficient method for price verification at a point of sale (POS) terminal. As described herein, when there is a price exception event, such as a customer disputing a price and/or a price for the item is not available at the POS terminal, the POS terminal receives a price exception input from the POS user. The price verification system then determines from an item database an item location within a retail environment and obtains a current image of the item location within the retail environment using cameras within the retail environment and/or stored images of the item locations, and determines from the current image of the item location a shelf price for the item. The image of the item location and the shelf price is then displayed for a customer to view so that the customer is informed of the price discrepancy and any alterations to the price at the POS terminal. Obtaining and displaying the current image information helps to streamline or facilitate checkout transactions with price exceptions for one or more persons in the environment as described in relation to FIGS. 1-9 herein.

FIG. 1 illustrates an exemplary retail environment including a plurality of items for purchase, according to one embodiment. The environment 100 includes a plurality of sensor modules 105 disposed in the ceiling 110 of the environment. The sensor modules 105 may each include one or more types of sensors, such as video and image sensors (e.g., cameras), and so forth. Sensor modules 105 may also include actuating devices for providing a desired position and/or orientation of the included sensor(s) such as in response to one or more manipulation inputs received from POS user described herein. Generally, the sensor modules or individual sensors may be disposed at any suitable location within the retail environment 100. Some non-limiting examples of alternative locations include below, within, or above a floor 115 of the environment, within other structural components of the retail environment 100 such as a shelving unit 120 or walls, and so forth. In some embodiments, the sensors 105 may be disposed on, within, or near item display areas such as the shelving unit 120. In some examples, the sensors are oriented within the environment 100 such that the items and associated shelf prices may be viewed by the sensors, even when one someone is interacting with the item.

The environment 100 also includes one or more shelving units 120 having shelves 140 that support various items 145, including item of interest 147. Though not shown, multiple shelving units 120 may be disposed in a particular arrangement in the environment 100, with the space between adjacent shelving units forming aisles through which people, such as customers and employees may travel. For example, customers may navigate the aisles and/or approach the shelving units 120 to view items 145 included therein, to handle the items, to select the items for purchase, etc. In another example, employees may navigate the aisles and/or approach the shelving units 120 to view stock levels of the items 145, to determine out-of-place items, determine display prices, etc. In some embodiments, the shelving units 120 may include visual sensors or other sensor devices or I/O devices also accessible by a price verification system described herein. The sensors 105 or devices may couple with a person's smartphone/personal mobile device 135 or employee device 136 and/or other networked computing devices (including terminals and/or servers) that are associated with the retail environment 100. For example, the front portions 150 of shelves 140 may include video sensors oriented outward from the shelving unit 120 (i.e., toward the aisle) to acquire image information for a person's interactions with items 145 on the shelving unit 120, with the image information provided to back-end servers for storage and/or analysis, such as access at a time of purchase at a POS terminal. In some cases, some or all of the image information may also be accessible by a person's mobile computing device. In some embodiments, portions of the shelving unit 120 (such as the front portions 150 of shelves 140) may include indicator lights or other visual display devices or audio output devices that are able to communicate with a person and/or the sensors 105 in order to provide item price information.

During an exemplary transaction in the environment, the person 130 may have a shopping receptacle in which the person places items after they are selected for purchase within the environment 100. Examples of shopping receptacles include shopping carts, baskets, or other containers that may be carried or otherwise transported by the person during the transaction. Upon completion of the transaction—for example, the person has selected all of the desired items—the person may approach a designated checkout area/POS terminal to perform a checkout transaction. Reducing time for checkout transactions and in particular price exception events increases the collective throughput at the checkout area and the POS terminal.

Figure 2:
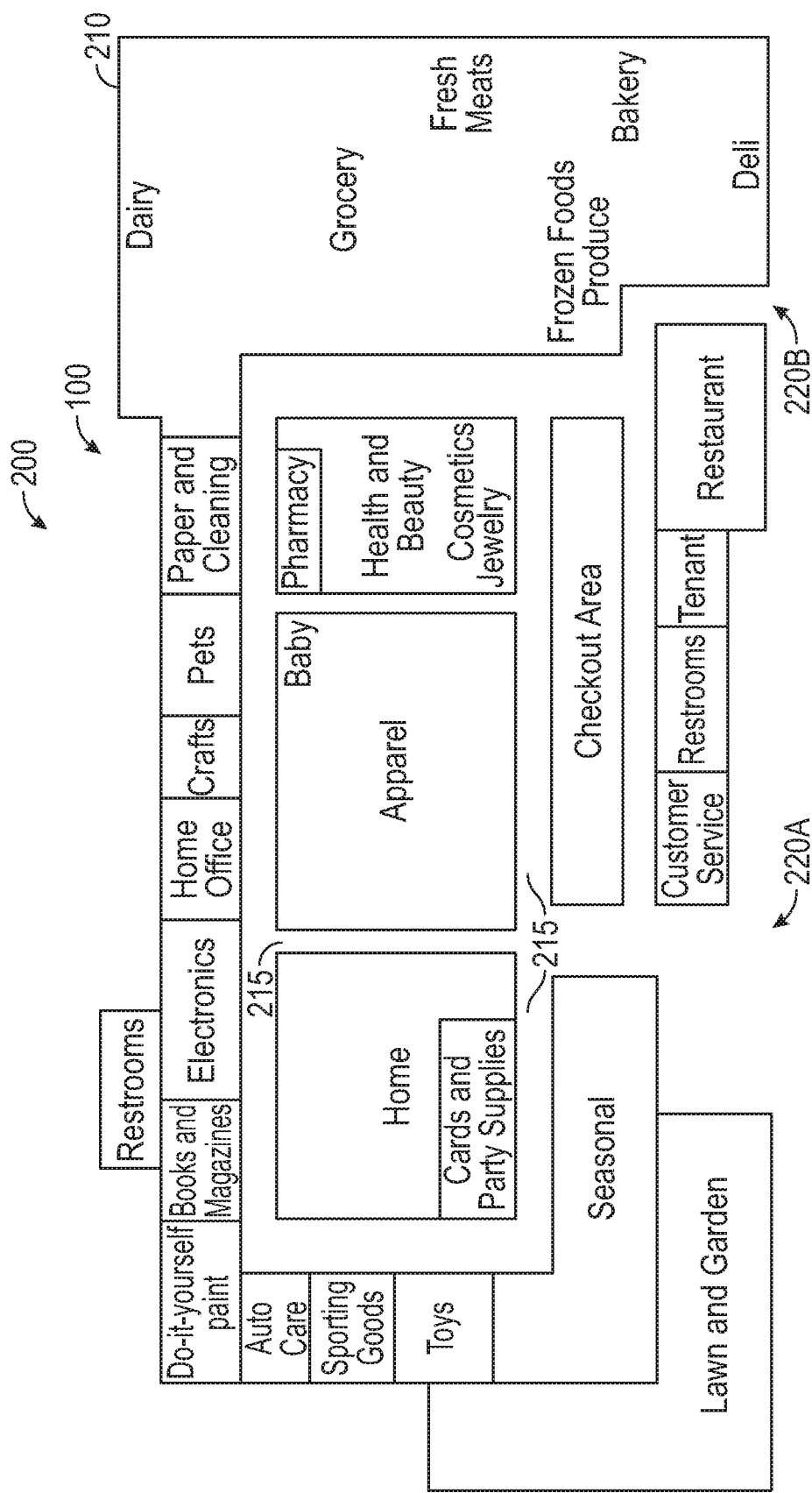
FIG. 2 illustrates an exemplary layout of the retail environment, according to one embodiment.

FIG. 2 illustrates an exemplary layout of an environment, according to one embodiment. Specifically, FIG. 2 depicts an exemplary floor plan (e.g., planogram) 200 for the environment 100. The floor plan 200 includes areas corresponding to different departments, each of which includes a number of items available for selection and purchase. The departments (no reference numbers) are labeled with the corresponding name (e.g., "Home," "Apparel," "Seasonal," etc.). Departments, such as grocery department 210, may be further subdivided into sub-departments (e.g., "Dairy," "Fresh Meats," etc.). Although not depicted, each department may include a number of shelving units or other structure that is suitable for storing, containing, and/or displaying items. The floor plan 200 may also include item location within the shelving units etc. for use in item location determinations. The departments may be separated by one or more pathways 215, along which a person may travel to beneficially avoid navigating through certain departments.

During an exemplary transaction in the retail environment, a person (e.g., a customer of the environment 100) may enter any number of departments and interact with various items included therein. Some examples of interactions include viewing items, handling items, selecting items for purchase, adding items to a shopping receptacle, noting item display prices, and so forth. Upon completion of the transaction, the person may transport selected items to a designated checkout area 205 having one or more checkout terminals and/or POS terminals. The checkout area 205 may be disposed near points of entry into and/or exit from the environment, such as entrances/exits 220A, 220B. Checkout terminals/POS terminals within checkout area 205 may be manned (e.g., POS terminals) or unmanned (e.g., self-checkout POS terminals). A number of employees may also be assigned within or adjacent to the checkout area 205 and assist customers such as in checkout transactions or assist with price discrepancies/price exception events. In some examples, the floor plan 200 includes information such as item location within the retail environment 100 and is stored on a price verification system. During a price exception event, the floor plan 200 is used by the price verification system to determine which of the sensors 105 should be used to obtain a current image of item location for display on the POS terminal.

Figure 3:
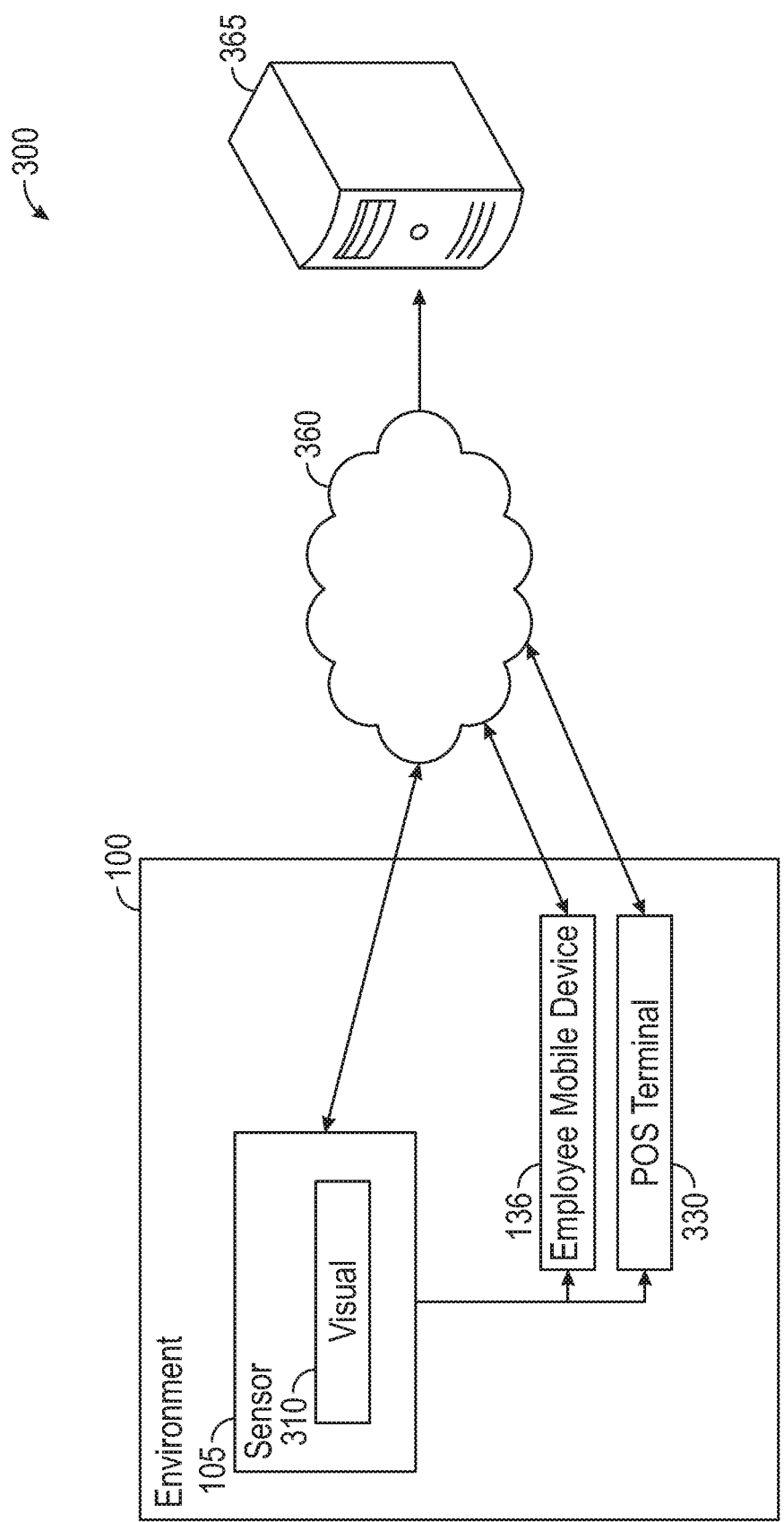
FIG. 3 illustrates an exemplary system for price verification in the retail environment, according to one embodiment.

FIG. 3 illustrates an exemplary price verification system 300, according to one embodiment. The system 300 includes a number of components that are disposed within the environment 100. The system 300 may also include components that are outside the environment 100—for example, a server 365 may be located remotely or proximately disposed to the environment (such as within a back room in the same building that is not accessible by customers).

Components within the environment 100 include one or more sensors 105 of various types, such as visual sensors 310. The sensors 105 may also include other sensors (not shown) capable of providing meaningful information about the retail environment 100, e.g., location and audio sensors. The sensors 105 may be discrete sensor devices deployed throughout the environment 100 in fixed and/or movable locations. Sensors 105 may be statically included in walls, floors, ceilings, displays, or other non-sensor devices, or may be included in shopping receptacles capable of being transported through the environment. In one embodiment, sensors 105 may include adjustable-position sensor devices, such as motorized cameras (i.e., an example of visual sensors 310) attached to a rail, wire, or frame. In one embodiment, sensors 105 may be included on one or more unmanned vehicles configured to travel through some or all of the environment 100, such as unmanned ground vehicles (UGVs) or unmanned aerial vehicles (UAVs or "drones"). Sensors 105 may also include sensor devices that are included in computing devices associated with the environment 100, such as personal devices 135 and employee devices 136. In some cases, the computing devices (or the component sensor devices) may be implemented as body-worn or carried devices.

In some cases, employee devices 136 may be carried by employees and used in the course of their employment. Both the employee devices 136 and the personal smart phones 135 may execute applications or other program code that generally enables various functions and features accessible using server 365, POS terminal 330, and/or other networked computing devices.

Server 365 generally includes processor(s), memory, and communications capabilities and may perform various computing tasks to support the operation of the system 300. Server 365 may communicate using various wired and/or wireless communications methods with sensors 105, and with other networked devices such as personal devices 135, employee devices 136, and the POS terminal 330. Server 365 generally executes computer program code in which input data is received from networked devices, the input data is processed and/or stored by the servers, and output data is provided to networked devices for operation of the system 300.

Network 360 may include one or more networks of various types, including a local area or local access network (LAN), a general wide area network (WAN), and/or a public network (e.g., the Internet). In one embodiment, various networked computing devices of the system 300 are interconnected using a LAN, and one or more computing devices (e.g., server 365, POS terminal 330) include connections to the Internet and one or more cloud computing models.

Figure 4:
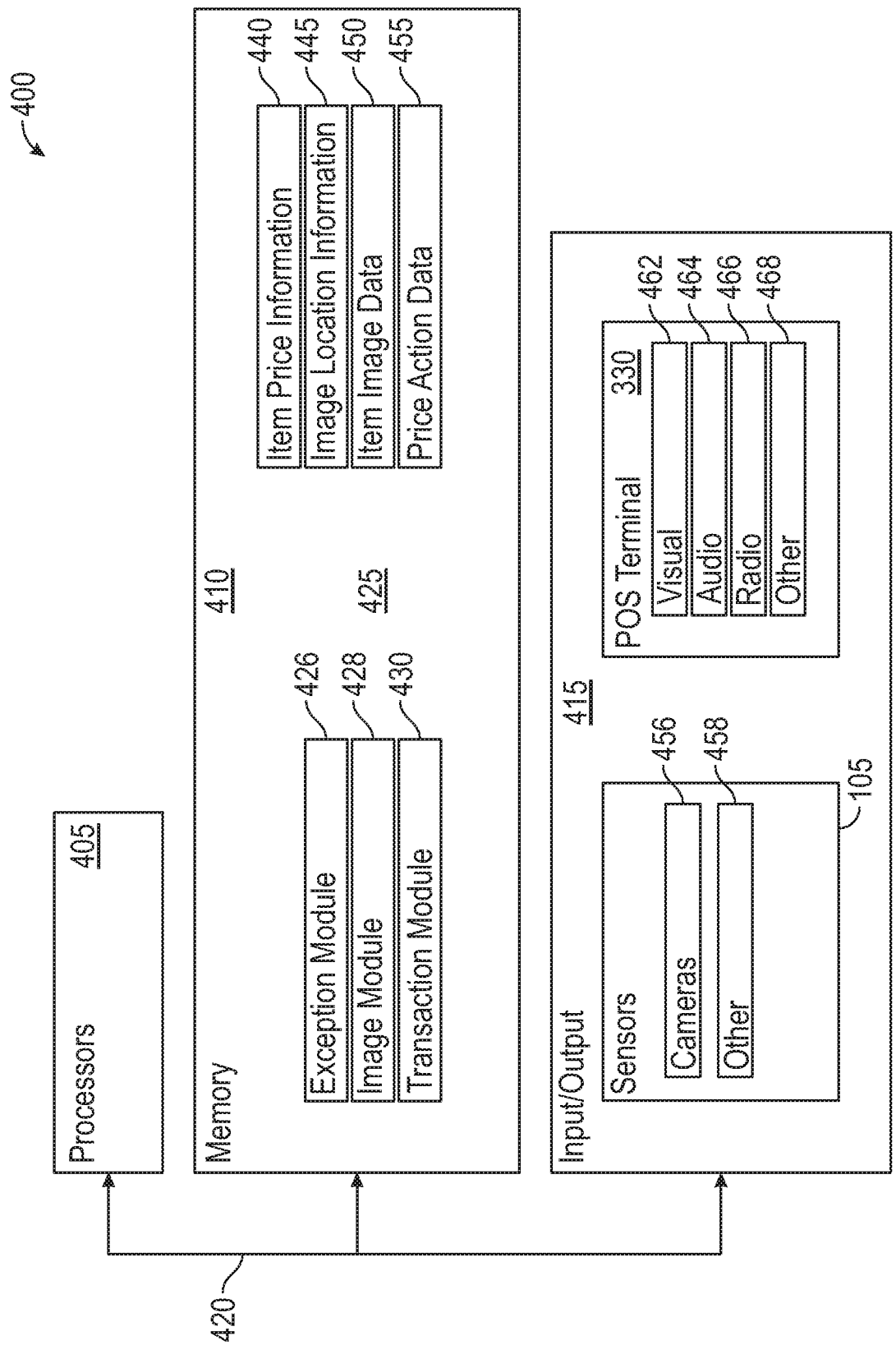
FIG. 4 is a block diagram illustrating a system for price verification, according to one embodiment.

FIG. 4 is a block diagram illustrating a system for price verification, according to one embodiment. Specifically, the arrangement 400 illustrates a block diagram of the system 300 of FIG. 3. Arrangement 400 includes a number of processors 405, memory 410, and input/output 415, which are interconnected using one or more connections 420. In one embodiment, the arrangement 400 may be implemented as a singular computing device and connection 420 may represent a common bus. In other embodiments, arrangement 400 is distributed and includes a plurality of discrete computing devices that are connected through wired or wireless networking. The processors 405 may include any processing element suitable for performing functions described herein, and may include single or multiple core processors, as well as combinations thereof. Processors 405 may be included in a single computing device, or may represent an aggregation of processing elements included across a number of networked devices such as employee devices 136, POS terminal 330, etc.

Memory 410 may include a variety of computer-readable media selected for their size, relative performance, or other capabilities: volatile and/or non-volatile media, removable and/or non-removable media, etc. Memory 410 may include cache, random access memory (RAM), storage, etc. Storage included as part of memory 410 may typically provide a non-volatile memory for the networked computing devices (e.g., server 365), and may include one or more different storage elements such as Flash memory, a hard disk drive, a solid state drive, an optical storage device, and/or a magnetic storage device. Memory 410 may be included in a single computing device or may represent an aggregation of memory included in networked devices. Memory 410 may include a plurality of modules 425 for performing various functions described herein. The modules 425 generally include program code that is executable by one or more of the processors 405. As shown, modules 425 include exception module 426, image module 428, and transaction module 430.

The modules 425 interact to perform certain functions as described in relation to FIGS. 5-9 herein. The person of ordinary skill will recognize that the modules provided here are merely non-exclusive examples; different functions and/or groupings of functions may be included as desired to suitably operate the environment. Memory 410 may also include item price information 440, which includes stored price information for items in the retail environment 100, and image location information 445, which includes information on one or more locations of items for sale within the retail environment 100. Memory 410 may also include item image data 450, which includes stored image data of the item and its surroundings in the retail environment 100, and price action data 455, which includes information and possible action to change a price of the item at the POS terminal 330 during an exception event. In one embodiment, the item price information 440, image location information 445, item image data 450, and price action data 455 may be stored on the server 365 or on a separate database.

Input/output (I/O) 415 includes at least cameras 456, which may encompass the various sensors 105 and visual sensors 310 depicted in FIGS. 1 and 3. In some examples, sensors 105 may be subdivided into worn (or carried) sensors that are worn or carried by persons within the environment, and distributed sensors that are disposed at fixed or movable locations within the environment 100. I/O 415 may further include input devices and output devices that may be included to enhance the transaction experience for persons in the environment including the POS terminal 330, where a customer checkouts and completes a purchase transaction. In some embodiments, the POS terminal 330 includes visual devices 462 (e.g., visual displays, indicators) and/or audio devices 464 (e.g., speakers) for communicating with persons including an employee and/or customer during their transactions. The POS terminal 330 may also include radio devices 466 and other devices 468 that provide information to people through tactile feedback (e.g., haptic devices) or using other sensory stimuli. The POS terminal 330 also includes input devices include suitable devices capable of receiving input from persons, such as cameras, keyboards or keypads, touchscreens, buttons, inertial sensors, etc. I/O 415 may further include wired or wireless connections to an external network (e.g., network 360) using I/O adapter circuitry.

Figure 5A:
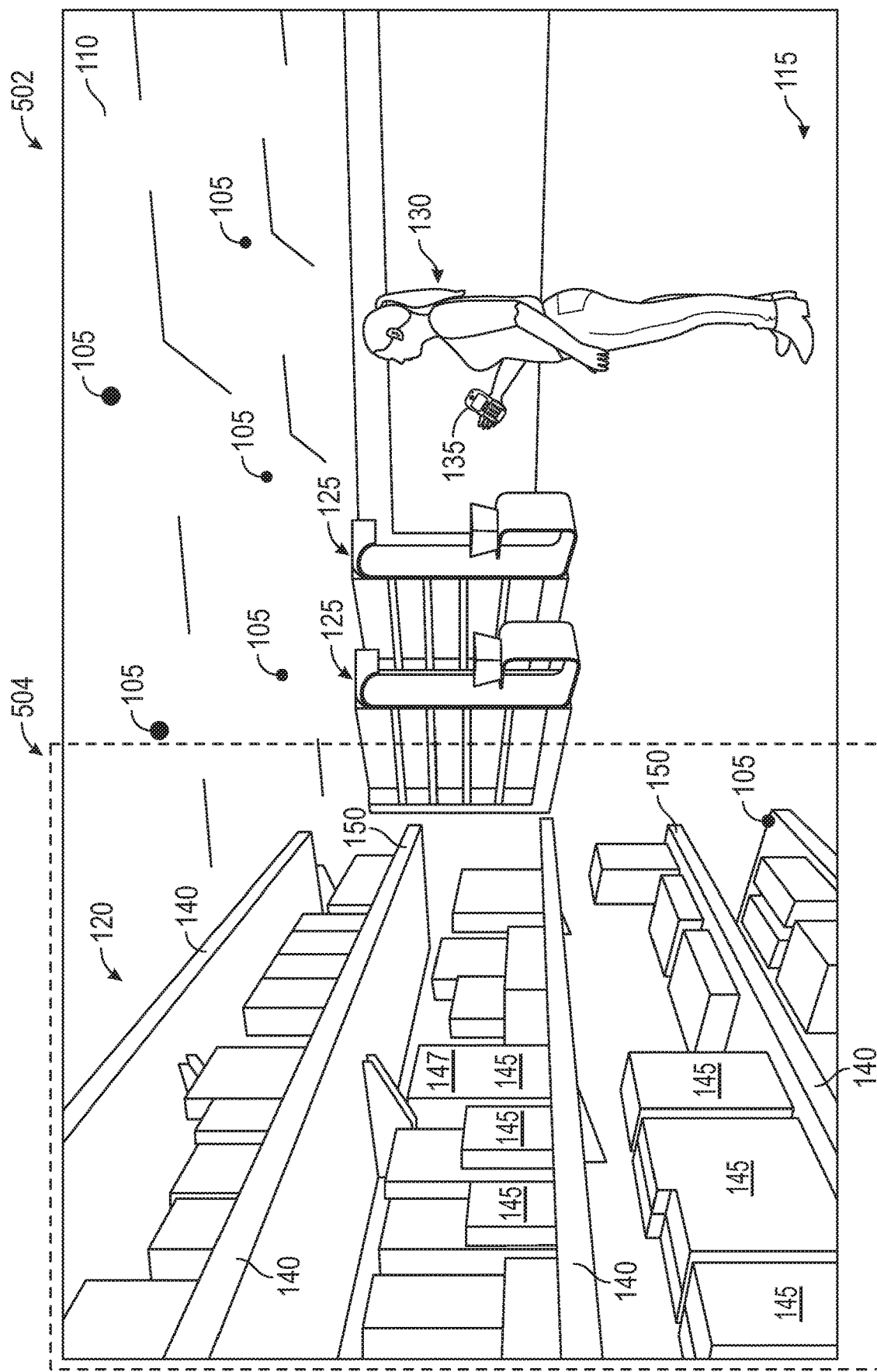
FIGS. 5A-C illustrates current images of an item in the retail environment, according to example embodiments.
Figure 5B:
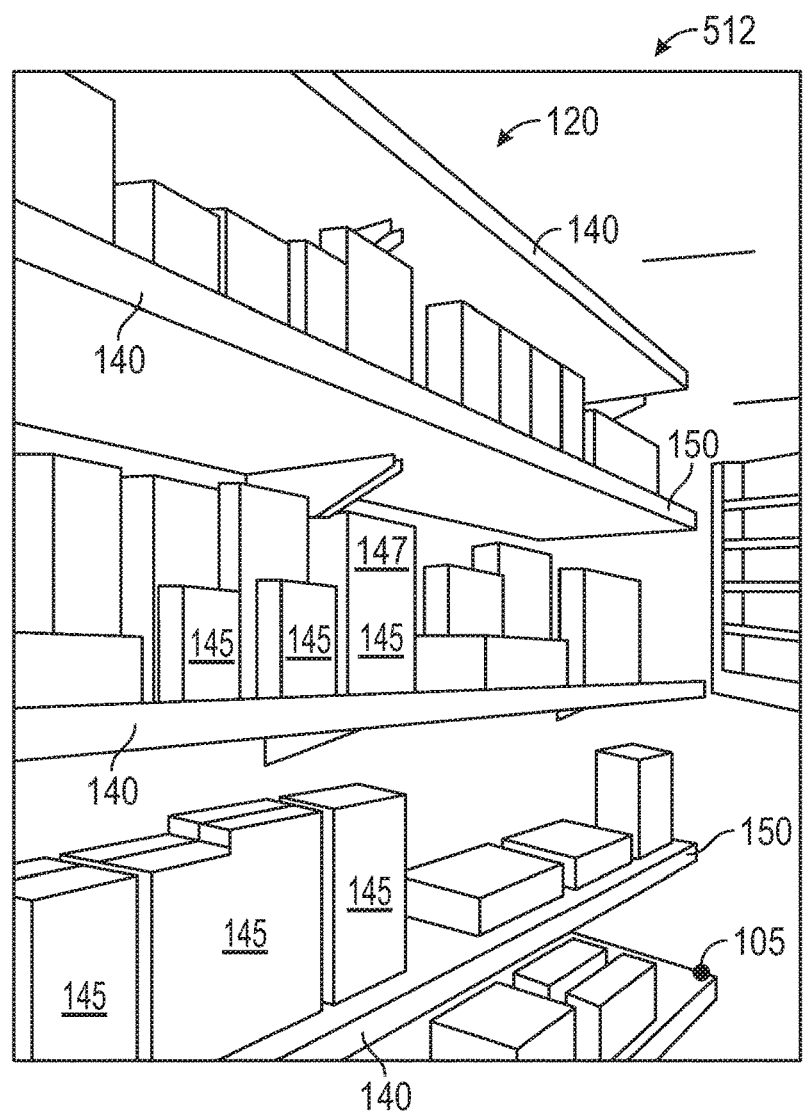
Figure 5C:
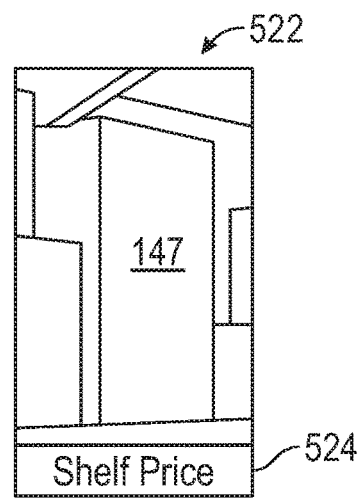

FIGS. 5A-C illustrates current images of an item in the retail environment, according to example embodiments. In some examples, the images described in FIGS. 5A-C are live stream images received from the sensors 105. In some examples, the images are images recently captures by the sensors 105 and stored in the item image database 450. FIG. 5A shows a current image 502 of the retail environment 100 including the item of interest 147, which corresponds to the item at the POS terminal associated with the price exception event. In some examples the current image 502 includes an image and/or live stream from a sensor 105 associated with a determined item location for the item at the POS terminal. The current image 502 is a wide view of the item of interest 147 and shelves 120, etc. surrounding the item. In some examples, during a price exception event, the image 502 is displayed at the POS terminal 330 for review by the POS user (employee) and the customer. In some examples, the price of the item of interest 147 may not be visible in the image 502, but the customer may still be shown the image 502 to confirm that this is the area/section of the retail environment that the customer acquired the item. In some examples, the system 300 may manipulate the image 502 automatically and/or in response to image manipulation inputs at the POS terminal in order to focus the image 502 on the item of interest 147. For example, a zoom field 504 may be applied to the image 502 to crop and zoom the focus of the image to produce current image 512 shown in FIG. 5B.

The current image 512 may be further altered/zoomed to focus on the item of interest 147 and the shelf price 524 as shown in current image 522 in FIG. 5C. In some examples, the image 522 is processed through image recognition, such as by the image module 428, to recognize the shelf price 524 displayed with the item of interest 147. In some examples, both the current image 522 and a numerical representation of the shelf price 524 are displayed at the POS terminal for review by a POS user and the customer. As described in further detail in relation to FIG. 6.

Figure 6:
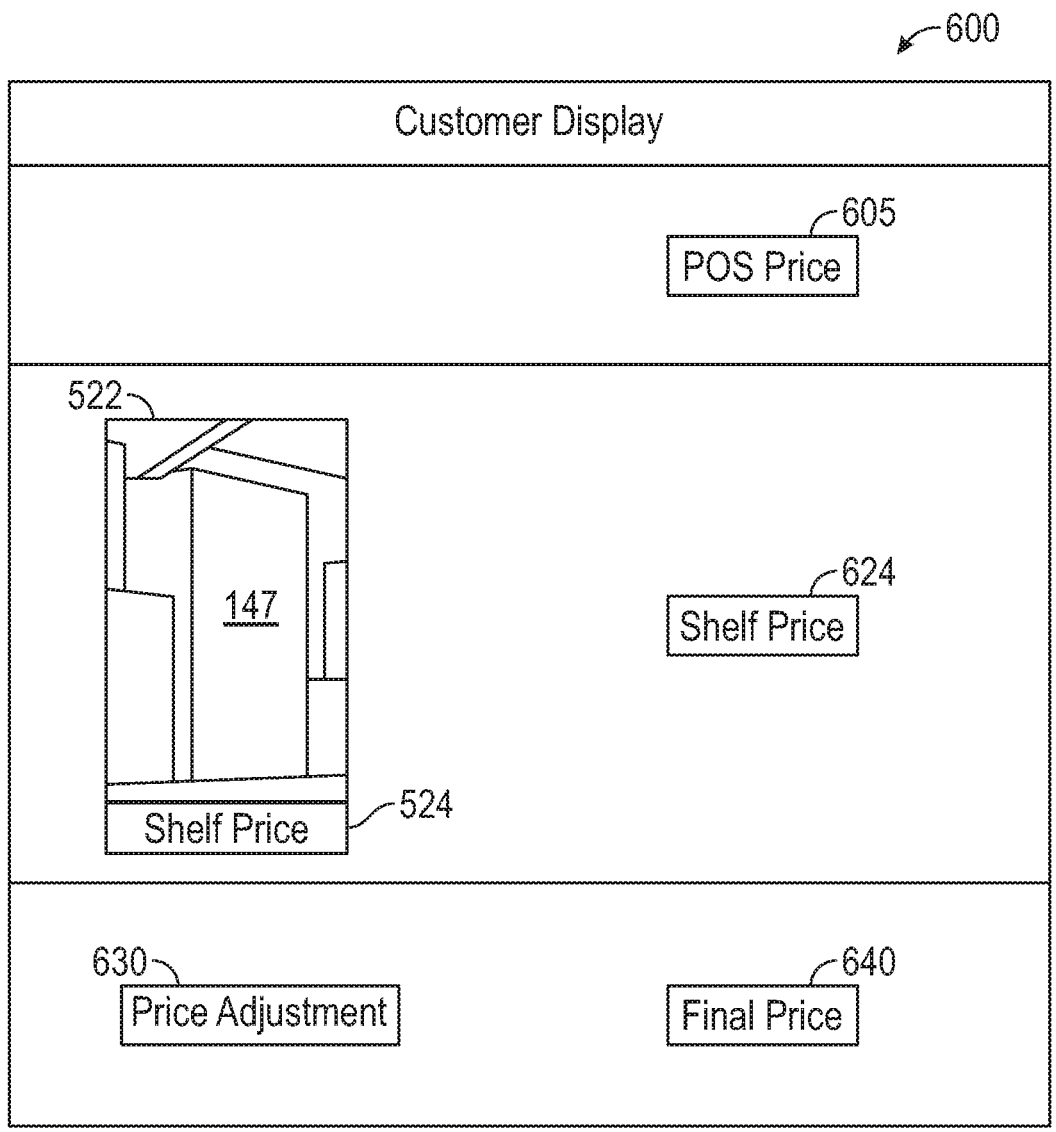
FIG. 6 illustrates a display at a point of sale retail endpoint, according to one embodiment.

FIG. 6 illustrates a display at a point of sale terminal, according to one embodiment. As shown, the display 600 may include a display at the POS terminal facing the customer and/or a moveable display that can be viewed by both the POS user (employee) and the customer. During a transaction and/or a price exception event, the display 600 displays the POS price 605, i.e. the price that is registered at the POS terminal 330 when the item is scanned, etc.

Once the POS user has interacted with the POS terminal 330 to indicate that a price exception has occurred, the system 300 obtains a current image of the item location within the retail environment and in some cases manipulates/focuses the image on the item of interest 147, as discussed in relation to FIGS. 5A-C. The system 300 also determines, through image recognition, the shelf price 524 displayed along with the item of interest 147 and generates a numerical representation 624 of the shelf price. The current image 522, showing the item of interest 147 and the shelf price 524 along with the numerical representation 624 are also displayed on the display 600 for customer review.

Figure 9:
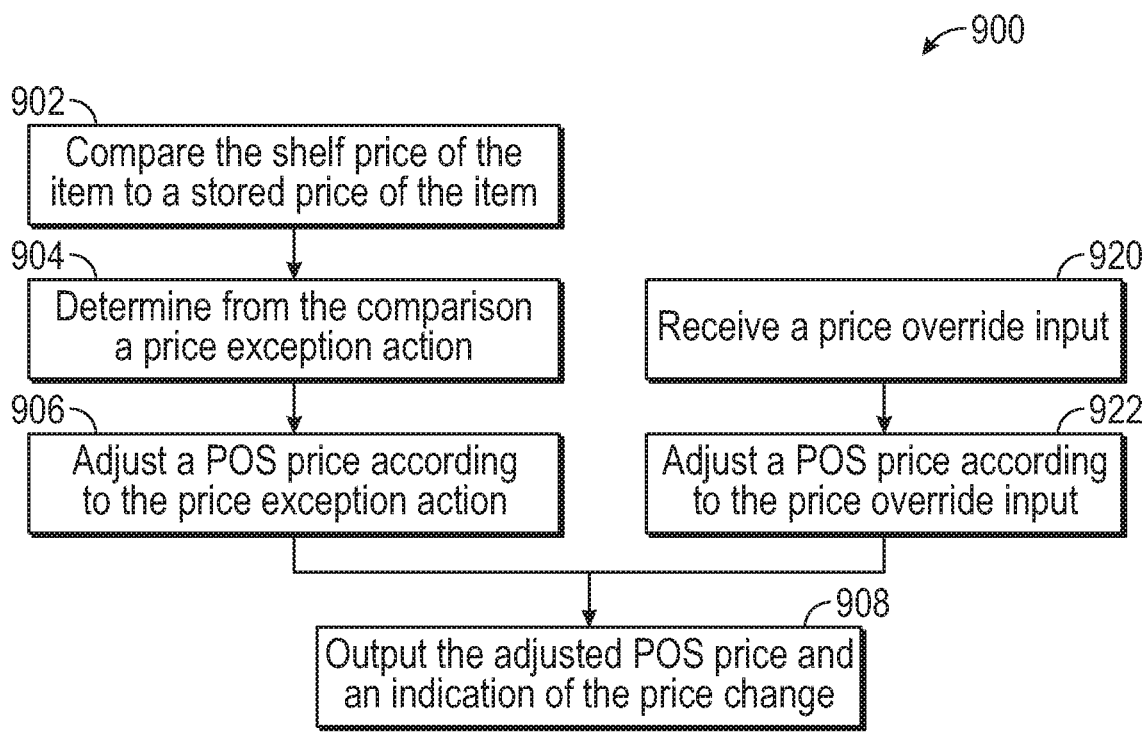
FIG. 9 illustrates a method to alter a price of the item, according to one embodiment.

In some examples, the system 300 also determines a price override and/or adjustment as described in relation to FIG. 9 and displays the price adjustment 630 and the final price 640 on the display 600 for customer review.

Figure 7:
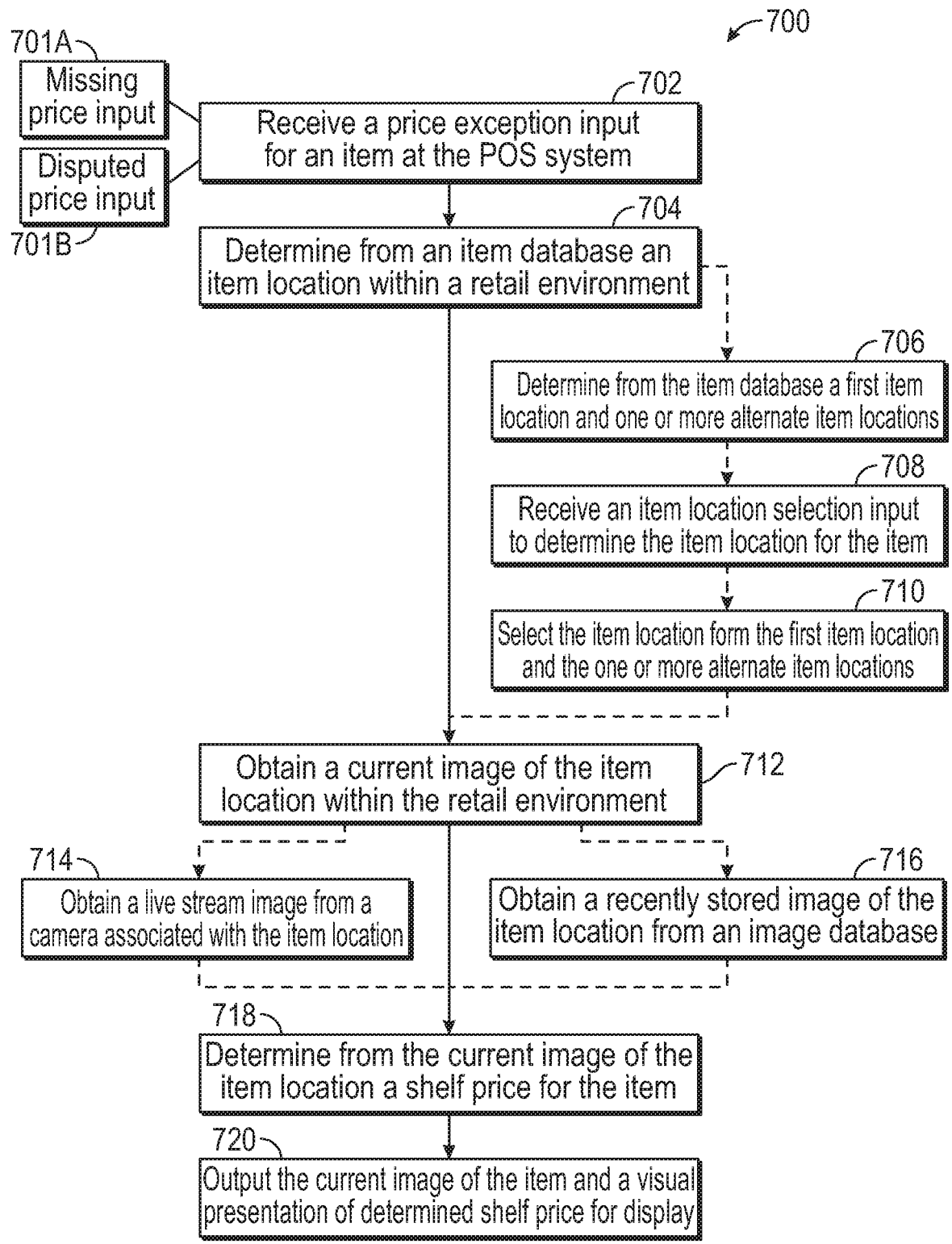
FIG. 7 illustrates a method to provide price verification, according to one embodiment.

FIG. 7 illustrates a method to provide price verification, according to one embodiment. Method 700 begins at block 702, where the exception module 426 receives a price exception input for an item at a point of sale (POS) endpoint, during a price exception event. For example, during a sale transaction at the POS terminal 330, a POS user may input a missing price input 701a and/or a disputed price input 701b through one or more input devices associated with the POS terminal 330. In some examples, the POS user is an employee working in the retail environment that interacts with the customer and the POS terminal to aid in the completion of the transaction/purchase of the item. In another example, the POS terminal is a self-checkout terminal and the user is a customer interacting directly with the POS terminal to complete the transaction.

In both examples, the user of the POS terminal may select a button and/or enter a code indicating that a price exception event has occurred. In some examples, the price exception input indicates that there is a discrepancy between the price registered at the POS terminal (e.g., the price added to the transaction total) and the price expected by the customer. For example, a customer may be expecting the item to cost $5 and the price registered at the POS terminal is $6. In this example, the POS user may select the input/button indicating a disputed price.

In another example, an item may be missing identification used to register a price and/or the price is not available at the POS terminal 330. For example, if the item is missing barcode and/or the barcode does not register at the POS terminal 330, the user and/or the system can indicate the missing price through the missing price input 701a.

While described above in relation to a dedicated POS terminal, the POS endpoints may also include any of personal devices 135 and employee devices 136. For example, a customer navigating the environment 100 may use device 135 to add an item to the transaction and also input a price exception input on the device 135 in order to indicate a price exception event.

At block 704, the exception module 426 determines from an item database an item location within a retail environment. For example, the exception module 426 uses information associated with the item, such as the barcode and/or identification information and image location information 445 to determine a location for the item within the retail environment 100. For example, when the item is toy, the exception module 426 determines from the floor plan 200 stored in the image location information 445 that the image location within the retail environment is the toy section shown in FIG. 2. The exception module 426 also determines an aisle and shelf location for the item in order to identify an appropriate sensor 105 to capture a current image of the item.

In another example, such as when the retail end point is a personal device 135, when the item is scanned or registered to a transaction by the device 135, the location of the personal device 135 may be determined and stored in the item databased and used to determine the item location during a price exception event.

In some examples, items are displayed in several locations within the retail environment 100. For example, items on sale and/or promoted by the retailed may be displayed in a standard location within the retail environment and also on endcaps/racks of aisles and in seasonal/rotating sections of the store, etc. In this example, method 700 proceeds to block 706, where the exception module 426 determines from the item database a first item location and one or more alternate item locations. For example, the exception module 426 determines that the toy item is located in the toy section shown in FIG. 2 (first item location), but also in the seasonal section shown in FIG. 2 (alternate location). In some examples, the system 300 may then output the first and alternate locations to a POS user and/or customer for display at the POS terminal 330. In some examples, the POS user may then select which location the customer acquired the item. For example, the customer may indicate that he acquired the item in the seasonal section and/or the stored location from the personal device 135 may be used to select the seasonal section.

At block 708, the exception module 426, receives an item location selection input received from the POS user at the POS terminal 330 in order to determine the item location for the item. For example, the POS user selects the seasonal location as the item location selection input at the POS terminal 330. At block 710, the exception module 426, selects the item location from the first item location and the one or more alternate item locations using the item location selection input. For example, the system 300 selects the seasonal (alternate) location as the item location.

At block 712, the image module 428 obtains a current image of the item location within the retail environment. In some examples, the system 300 obtains the current image of the item via a live photo/stream from a sensor 105 associated with the item location. For example, for the toy item, the system 300 obtains a live stream/image from a sensor 105 at or near the toy section shown in FIG. 2. In an example, where there are multiple sensors 105 in or near the toy section (item location), the exception module 426 and the image module 428 can use the item location information to select a best sensor 105 for viewing the item location and one or more alternate sensors in case the item of interest and price is not viewable in real-time.

At block 718, the image module 428 determines, from the current image of the item location, a shelf price for the item For example, the image module 428 using image recognition determines the shelf price for the item such as determining the shelf price associated with the item of interest 147. In some examples, a POS user may also interact with the POS terminal to aid the system 300 in selecting a portion of the current image that includes the shelf price and/or the item of interest such that the image can be processed to determine the shelf price.

At block 720 the image module 428 outputs the current image of the item and a visual presentation of determined shelf price for display. For example, the image module 428 outputs the current image 522 and the shelf price 624 as shown in FIG. 6. In an example, where the price of the POS terminal was missing, the transaction module also adds the shelf price to the transaction at the POS terminal 330. In some examples, the POS user and customer can also alter the current image and perform other actions to adjust a POS price at the POS terminal as described in relation to FIGS. 8 and 9. In some examples, the method 700 may include bypassing any manager override, alerts or interventions required by the price verification process (as needed). For example, the POS user may input a one or more bypasses in order to alter the price for the item at the POS terminal.

Figure 8:
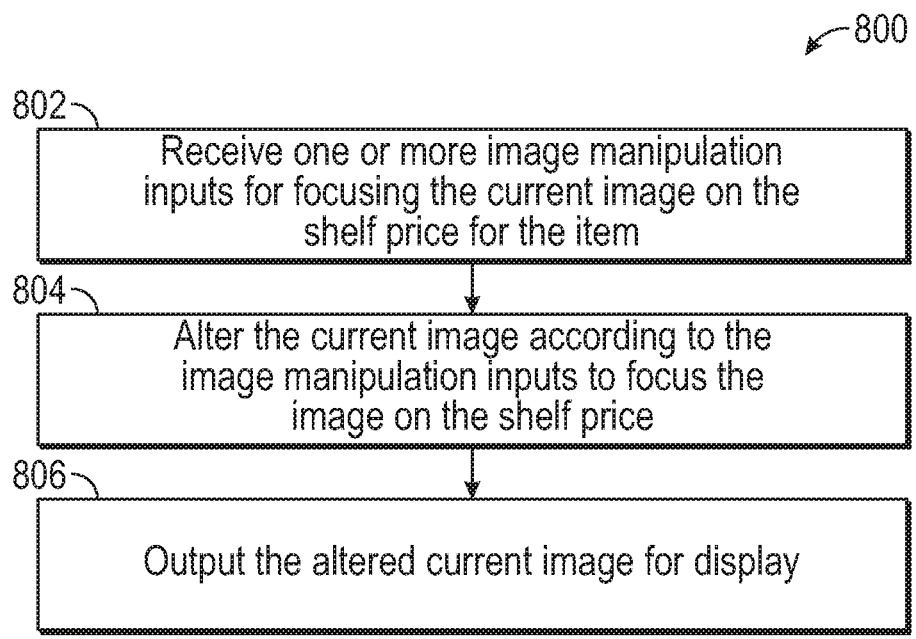
FIG. 8 illustrates a method to alter a current image of the item, according to one embodiment.

FIG. 8 illustrates a method to alter a current image of the item, according to one embodiment. Method 800 begins at block 802 where the image module 428 receives one or more image manipulation inputs for focusing the current image on the shelf price for the item. For example, the POS user at the POS terminal 330 may interact with a current image displayed at the POS terminal in order to zoom in on the image or otherwise search for or zoom onto the item of interest/shelf price in the image.

At block 804, the image module 428 alters the current image according to the image manipulation inputs to focus the image on the shelf price, and at block 806 the image module outputs the altered current image for display, such as shown in FIG. 6.

FIG. 9 illustrates a method to alter a price of the item, according to one embodiment. In one example, method 900 begins at block 902 where the transaction module 430 compares the shelf price of the item to a stored price of the item. At block 904 the transaction module 430, using the price action data 455, determines from the comparison a price exception action. For example, if the shelf price is lower than the stored price of the item the price exception action may indicate that the POS price for the item should be lowered to the display price. In one example, the transaction module 430 also flags the stored price and display price for review by an employee.

At block 906 the transaction module 430 adjusts a POS price according to the price exception action. For example, the POS price is lowered to the shelf price according to the price exception action. At block 908, the image module 428, outputs the adjusted POS price and an indication of the price exception action for display as described in FIG. 6.

In another example, method 900 begins at block 920, where the transaction module 430 receives a price override input and at block 922 adjusts the POS price according to the price override input. For example, if the shelf price and the POS price are the same (i.e. the customer's impression on the price was incorrect), but the POS user (in this example, an employee of the store) determines that the POS price should be altered anyway, the POS user instructs the POS terminal to override the POS price to meet the customer's expectations. In this example, the method 900 then proceeds to block 908 where the image module 428, outputs the adjusted POS price and an indication of the price exception action for display as shown in FIG. 6.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the exception and image modules) or related data available in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for price verification at a system comprising:
receiving a price exception input for an item at a point of sale (POS) retail endpoint;
determining from an item database a plurality of item locations within a retail environment, wherein the plurality of item locations comprise at least two different locations where the item is displayed for purchase within the retail environment;
outputting the plurality of item locations;
receiving an item location selection identifying the item location from the plurality of item locations;
obtaining a current image of the item location within the retail environment;
processing the current image of the item location to determine a shelf price for the item; and
outputting for display the current image of the item and a visual presentation of the determined shelf price.

2. The method of claim 1, wherein the price exception input comprises one or more of:
a missing price input for the item; and
a disputed price input of the item.

3. The method of claim 1, wherein determining the item location comprises:
determining from the item database a first item location and one or more alternate item locations;
receiving an item location selection input to determine the item location for the item; and
selecting the item location from the first item location and the one or more alternate item locations using the item location selection input.

4. The method of claim 1, wherein obtaining the current image of the item location within the retail environment comprises one or more of:
obtaining a live stream image from a camera associated with the item location; and
obtaining a recently stored image of the item location from an image database for the retail environment.

5. The method of claim 1, wherein obtaining the current image of the item location within the retail environment comprises:
receiving one or more image manipulation inputs for focusing the current image on the shelf price for the item;
altering the current image according to the image manipulation inputs to focus the image on the shelf price; and
outputting the altered current image for display.

6. The method of claim 1, further comprising:
comparing the shelf price of the item to a stored price of the item;
determining from the comparison a price exception action; and
adjusting a POS price according to the price exception action; and
outputting the adjusted POS price and an indication of the price exception action for display.

7. The method of claim 1, further comprising:
upon outputting the current image of the item and the visual presentation of determined shelf price for display, receiving a price override input;
adjusting a POS price according to the price override input; and
outputting the adjusted POS price and an indication of a price override for display.

8. A system to provide price verification, the system comprising:
one or more computer processors;
a memory containing program code which, when executed by the one or more computer processors, performs an operation comprising:
receiving a price exception input for an item at a point of sale (POS) retail endpoint;
determining from an item database a plurality of item locations within a retail environment, wherein the plurality of item locations comprise at least two different locations where the item is displayed for purchase within the retail environment;
outputting the plurality of item locations;
receiving an item location selection identifying the item location from the plurality of item locations;
obtaining a current image of the item location within the retail environment;
processing the current image of the item location to determine a shelf price for the item; and
outputting for display the current image of the item and a visual presentation of the determined shelf price.

9. The system of claim 8, wherein the price exception input comprises one or more of:
a missing price input for the item; and
a disputed price input of the item.

10. The system of claim 8, wherein determining the item location comprises:
determining from the item database a first item location and one or more alternate item locations;
receiving an item location selection input to determine the item location for the item; and
selecting the item location from the first item location and the one or more alternate item locations using the item location selection input.

11. The system of claim 8, wherein obtaining the current image of the item location within the retail environment comprises one or more of:
obtaining a live stream image from a camera associated with the item location; and
obtaining a recently stored image of the item location from an image database or the retail environment.

12. The system of claim 8, wherein obtaining the current image of the item location within the retail environment comprises:
  receiving one or more image manipulation inputs for focusing the current image on the shelf price for the item;
  altering the current image according to the image manipulation inputs to focus the image on the shelf price; and
  outputting the altered current image for display.

13. The system of claim 8, wherein the operation further comprises:
  comparing the shelf price of the item to a stored price of the item;
  determining from the comparison a price exception action; and
  adjusting a POS price according to the price exception action; and
  outputting the adjusted POS price and an indication of the price exception action for display.

14. The system of claim 8, wherein the operation further comprises:
  upon outputting the current image of the item and the visual presentation of determined shelf price for display, receiving a price override input;
  adjusting a POS price according to the price override input; and
  outputting the adjusted POS price and an indication of a price override for display.

15. A computer program product for price verification, the computer program product comprising:
  a computer-readable storage medium having computer-readable program code embodied therewith, the computer-readable program code executable by one or more computer processors to perform an operation that includes:
    receiving a price exception input for an item at a point of sale (POS) retail endpoint;
    determining from an item database a plurality of item locations within a retail environment, wherein the plurality of item locations comprise at least two different locations where the item is displayed for purchase within the retail environment;
    outputting the plurality of item locations;
    receiving an item location selection identifying the item location from the plurality of item locations;
    obtaining a current image of the item location within the retail environment;
    processing the current image of the item location to determine a shelf price for the item; and
    outputting for display the current image of the item and a visual presentation of the determined shelf price.

16. The computer program product of claim 15, wherein the price exception input comprises one or more of:
  a missing price input for the item; and
  a disputed price input of the item.

17. The computer program product of claim 15, wherein determining the item location comprises:
  determining from the item database a first item location and one or more alternate item locations;
  receiving an item location selection input to determine the item location for the item; and
  selecting the item location from the first item location and the one or more alternate item locations using the item location selection input.

18. The computer program product of claim 15, wherein obtaining the current image of the item location within the retail environment comprises one or more of:
  obtaining a live stream image from a camera associated with the item location; and
  obtaining a recently stored image of the item location from an image database for the retail environment.

19. The computer program product of claim 15, wherein obtaining the current image of the item location within the retail environment comprises:
  receiving one or more image manipulation inputs for focusing the current image on the shelf price for the item;
  altering the current image according to the image manipulation inputs to focus the image on the shelf price; and
  outputting the altered current image for display.

20. The computer program product of claim 15, wherein the operation further comprises:
  comparing the shelf price of the item to a stored price of the item;
  determining from the comparison a price exception action; and
  adjusting a POS price according to the price exception action; and
  outputting the adjusted POS price and an indication of the price exception action for display.

* * * * *